United States Patent
Wyse

(10) Patent No.: US 10,979,091 B1
(45) Date of Patent: Apr. 13, 2021

(54) RECONFIGURABLE WIDEBAND IMAGE SUPPRESSING RECEIVER

(71) Applicant: Rockwell Collins, Inc., Cedar Rapids, IA (US)

(72) Inventor: Russell D. Wyse, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/518,224

(22) Filed: Jul. 22, 2019

(51) Int. Cl.
| H03D 7/00 | (2006.01) |
| H03D 7/16 | (2006.01) |
| H01B 1/18 | (2006.01) |
| H04B 1/04 | (2006.01) |
| H04B 1/10 | (2006.01) |

(52) U.S. Cl.
CPC ... *H04B 1/1036* (2013.01); *H04B 2001/1063* (2013.01); *H04B 2001/1072* (2013.01)

(58) Field of Classification Search
CPC .......... H04B 1/00; H04B 1/48; H04B 1/1036; H04B 2001/1063; H04B 2001/1072; H03F 3/68; H03F 3/45; H01Q 1/24; H03D 7/00; H03D 7/16
See application file for complete search history.

(56) References Cited

U.S. PATENT DOCUMENTS

| 8,644,787 | B1 * | 2/2014 | Wyse | ................... | H04B 1/0078 455/296 |
| 8,660,514 | B1 | 2/2014 | Wyse | | |
| 8,963,612 | B1 | 2/2015 | Wyse et al. | | |
| 9,059,662 | B1 | 6/2015 | Wyse et al. | | |
| 9,240,815 | B1 | 1/2016 | Wyse | | |
| 9,325,288 | B2 * | 4/2016 | Tsukizawa | ........... | H03G 3/3042 |
| 9,432,126 | B1 | 8/2016 | Wyse et al. | | |
| 2008/0057899 | A1 * | 3/2008 | Montemayor | ........... | H04B 1/28 455/255 |
| 2016/0164569 | A1 * | 6/2016 | Morton | ..................... | H04B 1/30 375/296 |
| 2019/0312604 | A1 * | 10/2019 | Huang | ................... | H01Q 1/247 |

FOREIGN PATENT DOCUMENTS

| EP | 1758046 A1 * | 2/2007 | ........... G06K 7/0008 |
| EP | 2037591 A2 * | 3/2009 | ............... H04B 1/18 |

* cited by examiner

*Primary Examiner* — Pablo N Tran
(74) *Attorney, Agent, or Firm* — Suiter Swantz pc llo

(57) ABSTRACT

A reconfigurable image suppressing receiver includes a front-end amplifier, a first multi-mode circuit, a second multi-mode circuit, a wideband combining transformer, and a controller. The front-end amplifier is configured to receive a radio frequency (RF) signal from an antenna and adjust a gain of the RF signal. The first multi-mode circuit is configured to mix a first instance of the RF signal with an in-phase local oscillator signal to generate an in-phase intermediate frequency (IF) signal. The second multi-mode circuit is configured to mix a second instance of the RF signal with a quadrature local oscillator signal to generate a quadrature IF signal. The wideband combining transformer is configured to combine the in-phase IF signal and the quadrature IF signal to generate a combined IF signal. The controller is configured to adjust one or more tunable parameters associated with the combined IF signal.

13 Claims, 15 Drawing Sheets

RECONFIGURABLE WIDEBAND IMAGE SUPPRESSING RECEIVER

BACKGROUND

As a result of RF mixing, a signal and its image may be simultaneously detected by a receiver. Consequently, a receiver with poor image rejection may suffer from higher levels of interference than one with better image rejection. Thus, there is a need for high performance image rejection capability in radio receivers that are used for sensitive communications applications (e.g., for aircraft-to-aircraft, aircraft-to-ground, and/or critical mission communications).

SUMMARY

A reconfigurable image suppressing receiver is disclosed. In one or more embodiments, the reconfigurable image suppressing receiver includes a front-end amplifier, a first multi-mode circuit, a second multi-mode circuit, a wideband combining transformer, and a controller. The front-end amplifier is configured to receive a radio frequency (RF) signal from an antenna and adjust a gain of the RF signal. The first multi-mode circuit is configured to mix a first instance of the RF signal with an in-phase local oscillator signal to generate an in-phase intermediate frequency (IF) signal. The second multi-mode circuit is configured to mix a second instance of the RF signal with a quadrature local oscillator signal to generate a quadrature IF signal. The wideband combining transformer is configured to combine the in-phase IF signal and the quadrature IF signal to generate a combined IF signal. The controller is configured to adjust one or more tunable parameters associated with the combined IF signal. For example, the controller may be configured to select a sideband or both sidebands of the reconfigurable image suppressing receiver by controlling at least one phase parameter of the in-phase and quadrature local oscillator signals and/or amplitude parameter of the in-phase and quadrature IF signals.

In some embodiments of the reconfigurable image suppressing receiver, the first multi-mode circuit is further configured to adjust a first phase of the in-phase local oscillator signal, and the second multi-mode circuit is further configured to adjust a second phase of the quadrature local oscillator signal.

In some embodiments of the reconfigurable image suppressing receiver, the controller is configured to select the sideband of the reconfigurable image suppressing receiver by causing the first multi-mode circuit and the second multi-mode circuit to place the in-phase local oscillator signal and the quadrature local oscillator signal ±90 degrees out of phase when the first instance of the RF signal and the second instance of the RF signal are 0 or 180 degrees out of phase.

In some embodiments of the reconfigurable image suppressing receiver, the controller is configured to select both sidebands of the reconfigurable image suppressing receiver by causing the first multi-mode circuit and the second multi-mode circuit to place the in-phase local oscillator signal and the quadrature local oscillator signal in-phase when the first instance of the RF signal and the second instance of the RF signal are in-phase.

In some embodiments of the reconfigurable image suppressing receiver, the controller is configured to cause the first multi-mode circuit and the second multi-mode circuit to adjust the first phase of the in-phase local oscillator signal and the second phase of the quadrature local oscillator signal to compensate for statistical and temperature variations of components.

In some embodiments of the reconfigurable image suppressing receiver, the controller is configured to cause the first multi-mode circuit and the second multi-mode circuit to adjust the first phase of the in-phase local oscillator signal and the second phase of the quadrature local oscillator signal around +90 degrees or +270 degrees to tune image rejection behavior of the reconfigurable image suppressing receiver.

In some embodiments of the reconfigurable image suppressing receiver, the first multi-mode circuit is further configured to adjust a first gain of the in-phase IF signal, and wherein the second multi-mode circuit is further configured to adjust a second gain of the quadrature IF signal.

In some embodiments of the reconfigurable image suppressing receiver, the controller is configured to cause the first multi-mode circuit and the second multi-mode circuit to adjust the first gain of the in-phase IF signal and the second gain of the quadrature IF signal to compensate for statistical and temperature variations of components.

In some embodiments of the reconfigurable image suppressing receiver, the controller is configured to cause the front-end amplifier to adjust the gain of the RF signal to compensate for statistical and temperature variations of components.

In some embodiments of the reconfigurable image suppressing receiver, the reconfigurable image suppressing receiver further includes a local oscillator configured to generate a local signal with a selected frequency.

In some embodiments of the reconfigurable image suppressing receiver, the reconfigurable image suppressing receiver further includes: a first phase shifter configured to adjust a first phase of a first instance of the local signal to generate the in-phase local oscillator signal; and a second phase shifter configured to adjust a second phase of a second instance of the local signal to generate the quadrature local oscillator signal.

In some embodiments of the reconfigurable image suppressing receiver, the reconfigurable image suppressing receiver further includes a back-end amplifier configured to adjust a gain of the combined IF signal.

In some embodiments of the reconfigurable image suppressing receiver, the reconfigurable image suppressing receiver further includes a tunable filter between the wideband combining transformer and the back-end amplifier.

In some embodiments of the reconfigurable image suppressing receiver, the controller is configured to adjust the one or more tunable parameters by reconfiguring the tunable filter into a selected type of filter and adjusting at least one of a gain response shape or a frequency response shape of the tunable filter.

In some embodiments of the reconfigurable image suppressing receiver, the selected type of filter may include a low pass, high pass, bandpass, or notch filter.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
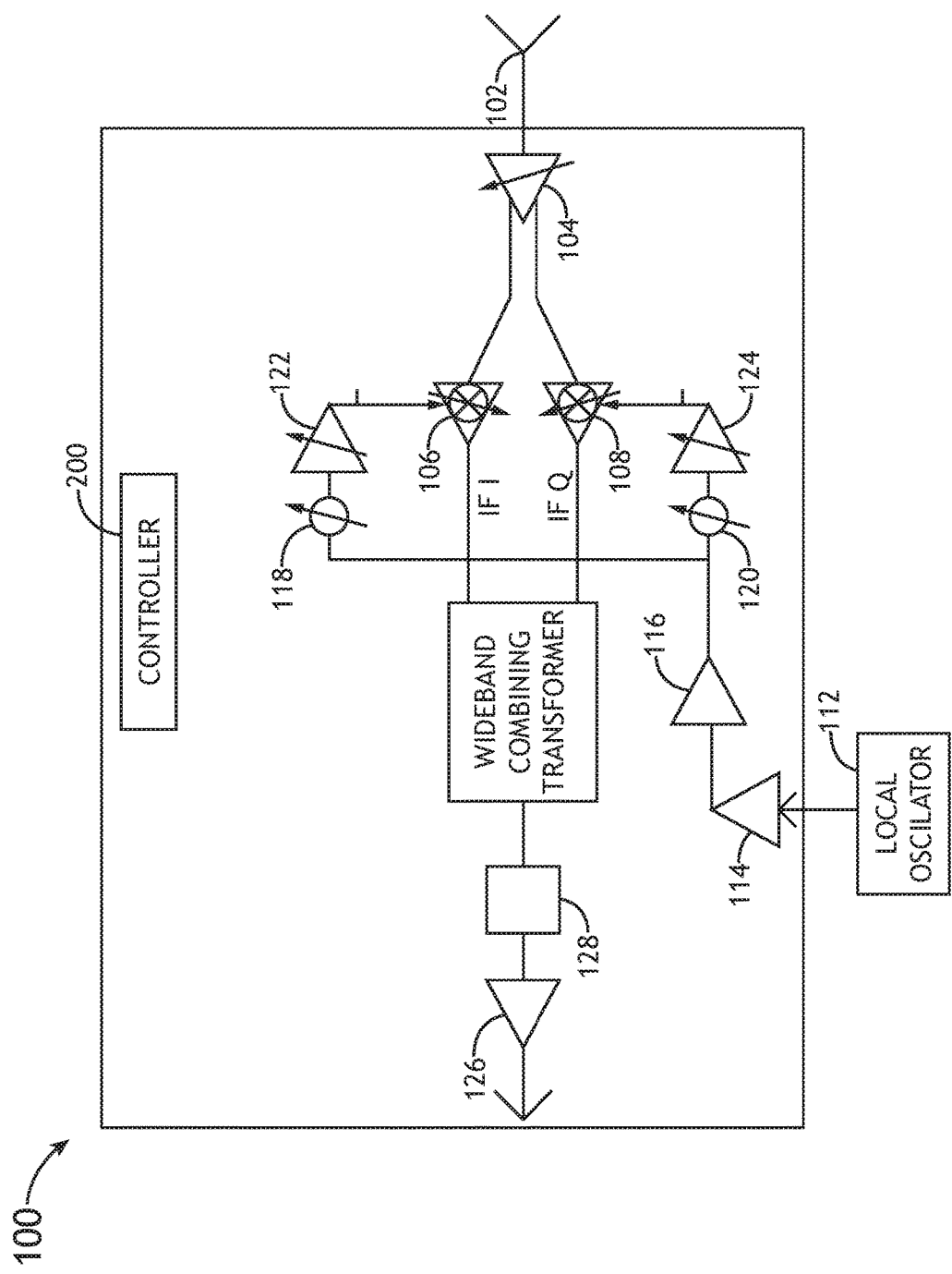
FIG. 1 is a block diagram illustrating a reconfigurable image suppressing receiver, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A reconfigurable wideband image suppressing receiver is disclosed. The reconfigurable wideband image suppressing receiver provides high performance, reconfigurable image rejection capability that can be used for sensitive communications applications (e.g., for aircraft-to-aircraft, aircraft-to-ground, and/or critical mission communications), among others. In embodiments, the reconfigurable wideband image suppressing receiver employs microwave/millimeter wave ultra-wideband receiver topology (e.g., RF coverage from 10 GHz to 60+ GHz utilizing silicon germanium bipolar plus complementary metal-oxide-semiconductor (SiGe BiCMOS) processes). The reconfigurable wideband image suppressing receiver has been demonstrated to achieve >4 GHz instantaneous bandwidth (IBW) with >40 dBc image rejection; >50 dBc for 2 GHz; and >56 dBc for 500 MHz. Other advantages/features include, but are not limited to, size, weight, power and cost (SWP-C) reduction by use of fully integrated, ultra-small and high linearity topologies; an ability to "self-heal" from statistical process or temperature variations with minimal calibration (e.g., by adjusting local oscillator (LO) quadrature I/Q phase and/or RF and/or intermediate frequency (IF) amplitude utilizing reconfigurable components); ability to choose information sidebands (high side, low side, or both) resulting in reduced LO synthesizer frequency coverage requirements; ability to zoom in on desired narrower bandwidths with increasing image rejection and increased sensitivity by adjusting LO quadrature phase and RF or IF amplitude balance; sideband flexibility with adjustable bandwidth capability allowing for advantageous electronic warfare (EW) system capability in sweeping spectrum to find energy/information at improved speed and size/power/cost; and controlled time delay behavior across IBW versus any existing RF filtering capability— this is a key capability for implementing time delay in broadband electronically scanned arrays (ESA).

FIG. 1 illustrates a reconfigurable image suppressing receiver 100, in accordance with various embodiments of this disclosure. The reconfigurable image suppressing receiver 100 includes a front-end amplifier 104 (e.g., a variable gain amplifier (VGA), multi-mode circuit with independent output channel gain/phase control for reconfiguring RF input behaviors going into multi-mode circuit 106/108, or the like) configured to receive a RF signal from an antenna 102 (e.g., a differential antenna) and adjust a gain of the RF signal. The front-end amplifier 104 may be configured to receive a single input from the antenna 102 and generate two independent outputs with independent reconfigurable gain adjustment and the ability to adjust the signals to be in or out of phase with each, a first and second instance of the gain and phase-adjusted RF signal. In some embodiments, the front-end amplifier 104 includes an in-phase/quadrature (I/Q) generator configured to provide an in-phase RF signal (i.e., the first instance of the RF signal) and a quadrature RF signal (i.e., the second instance of the RF signal) based on the RF signal received via the antenna 102.

The reconfigurable image suppressing receiver 100 further includes a first multi-mode circuit 106 and a second multi-mode circuit 108 that are communicatively coupled to the front-end amplifier 104. The first multi-mode circuit 106 is configured to mix the first instance of the RF signal with an in-phase LO signal to generate an in-phase IF signal, and the second multi-mode circuit 108 is configured to mix the second instance of the RF signal with a quadrature LO signal to generate a quadrature IF signal. In embodiments, multi-mode circuit 106/108 is a TRIUN element that can pass the signal directly, if configured as a VGA, or mix and do frequency translation if configured as a mixer. The first multi-mode circuit 106 and the second multi-mode circuit 108 may include multiple mode circuits, such as those described in U.S. Pat. No. 8,660,514, "Multiple Mode RF Circuit," by Russell D. Wyse, and U.S. Pat. No. 8,963,612, "Multiple mode RF Circuit," by Russell D. Wyse et al., which are incorporated herein by reference in their entireties. In this regard, the first multi-mode circuit 106 and the second multi-mode circuit 108 may be further configured to adjust the gain (e.g., amplify) the in-phase IF signal and the quadrature IF signal, respectively, when operated in an amplifier mode instead of, or in addition to, the mixer mode of operation. It is noted that in the amplifier/VGA mode there is no frequency translation, so the IF signal is at the same frequency as the RF input. This kind of non-frequency translation capability may be beneficial for extending the RF coverage lower in frequency where signals can be passed out the IF into ADCs directly for a direct sample behavior. The multi-mode circuits 106, 108 may then be switched to mixing for higher RFs that are then frequency-translated down into the ADC's sampling bandwidth.

In embodiments, a local oscillator (LO) 112 is configured to generate a local signal with a selected frequency. The in-phase LO signal and the quadrature LO signal are based on the local signal. The LO 112 may be a tunable frequency synthesizer, tunable crystal oscillator, or the like. The LO 112 may be configured to transmit the local signal through an active balun 114 and/or buffer 116 to respective in-phase and quadrature LO branches including first and second phase shifters 118 and 120. The first phase shifter 118 may be configured to adjust a first phase of a first instance of the local signal to generate the in-phase LO signal. Similarly, the second phase shifter 120 may be configured to adjust a second phase of a second instance of the local signal to generate the quadrature LO signal. In some embodiments, the reconfigurable image suppressing receiver 100 further includes a first VGA 122 configured to adjust the gain/amplitude of the in-phase LO signal (e.g., by amplifying the in-phase LO signal), and a second VGA 124 configured to adjust the gain/amplitude of the quadrature LO signal (e.g., by amplifying the quadrature LO signal). As discussed above, the in-phase and quadrature LO signals are then mixed with the first and second instances of the RF signal at the first and second multi-mode circuits 106 and 108, respectively, to generate the in-phase and quadrature IF signals.

The first multi-mode circuit 106 and the second multi-mode circuit 108 may be communicatively coupled to a wideband combining transformer 110 that is configured to combine the in-phase IF signal and the quadrature IF signal to generate a combined IF signal. The wideband combining transformer 110 may include an active combiner, such as the "Active Combiner" described in U.S. Pat. No. 9,059,662, by Russell D. Wyse et al., which is incorporated herein by reference in its entirety. In some embodiments, the wideband combining transformer 110 may include, but is not limited to, an IF 2×1 90 degree combining transformer. In some embodiments, the reconfigurable image suppressing receiver 100 further includes a back-end amplifier 126 (e.g., a VGA, or the like) configured to adjust a gain/amplitude of the combined IF signal. The reconfigurable image suppressing receiver 100 may also include a tunable filter 128 between the wideband combining transformer 110 and the back-end amplifier 126. In embodiments, the tunable filter 128 may include a reconfigurable filter, such as the "Reconfigurable Filter" described in U.S. Pat. No. 9,240,815, by Russell D. Wyse, which is incorporated herein by reference in its entirety, or the "Reconfigurable Filter" described in U.S. Pat. No. 9,432,126, by Russell D. Wyse et al., which are incorporated herein by reference in their entireties. In other embodiments, the tunable filter 128 may include an analog, digital, or hybrid filter with adjustable resistance (R), inductance (L), and/or capacitance (C) values, or the like.

The reconfigurable image suppressing receiver 100 further includes a controller 200 configured to adjust one or more tunable parameters associated with the combined IF signal. For example, the controller 200 may be configured to control any combination of the variable/tunable components (e.g., front-end amplifier 104, multi-mode circuits 106 and 108, LO 112, phase-shifters 118 and 120, VGAs 122 and 124, band-end amplifier 126, and/or tunable filter 128) in order to tune the signal response (e.g., image rejection response) of the reconfigurable image suppressing receiver 100. In this regard, the controller 200 may be configured to adjust the one or more tunable parameters by performing one or more of the following operations: adjusting the gain of the incoming RF signal (e.g., by tuning front-end amplifier 104 and/or multi-mode circuits 106 and 108); adjusting the selected frequency of the local signal (e.g., by tuning the LO 112); adjusting the first phase of the first instance of the local signal and the second phase of the second instance of the local signal (e.g., by tuning phase-shifters 118 and 120); adjusting the gain/amplitude of the in-phase IF signal and the gain/amplitude of the quadrature IF signal (e.g., by tuning multi-mode circuits 106 and 108 and/or the independent outputs of front-end amplifier 104); adjusting the gain of the combined IF signal (e.g., by tuning back-end amplifier 126); and/or adjusting the bandwidth, gain/frequency response shape or response type (low pass, high pass, bandpass, notch) of the tunable filter 128.

Figure 2:
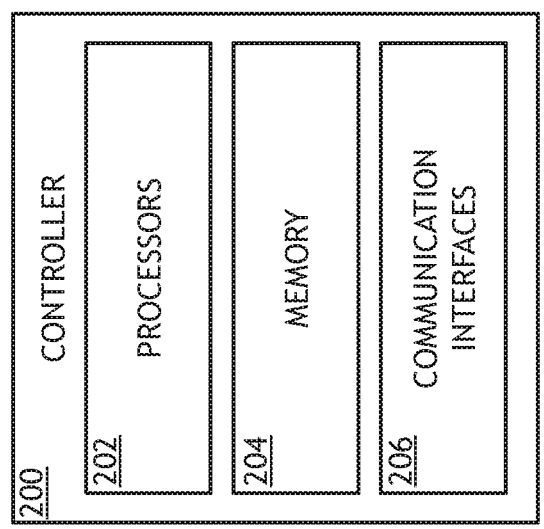
FIG. 2 is a block diagram illustrating a controller for the reconfigurable image suppressing receiver, in accordance with one or more embodiments of this disclosure.

FIG. 2 illustrates an embodiment of the controller 200, which may include, but is not limited to, at least one processor 202, memory 204, and communication interface 206. The processor 202 provides processing functionality for at least the controller 200 and can include any number of processors, micro-controllers, circuitry, field programmable gate array (FPGA) or other processing systems, and resident or external memory for storing data, executable code, and other information accessed or generated by the controller 200. The processor 202 can execute one or more software programs embodied in a non-transitory computer readable medium (e.g., memory 204) that implement techniques described herein. The processor 202 is not limited by the materials from which it is formed, or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the controller 200/processor 202, such as software programs and/or code segments, or other data to instruct the processor 202, and possibly other components of the controller 200, to perform the functionality described herein. Thus, the memory 204 can store data, such as a program of instructions for operating the controller 200, including its components (e.g., processor 202, communication interface 206, etc.), and so forth. It should be noted that while a single memory 204 is described, a wide variety of types and combinations of memory (e.g., tangible, non-transitory memory) can be employed. The memory 204 can be integral with the processor 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the controller 200. For example, the communication interface 206 can be configured to retrieve data from the processor 202 or other devices, transmit data for storage in the memory 204, retrieve data from storage in the memory 204, and so forth. The communication interface 206 can also be communicatively coupled with the processor 202 to facilitate data transfer between components of the controller 200 and the processor 202. It should be noted that while the communication interface 206 is described as a component of the controller 200, one or more components of the communication interface 206 can be implemented as external components communicatively coupled to the controller 200 via a wired and/or wireless connection. The controller 200 may be connected to one or more input/output (I/O) devices, system components (e.g., front-end amplifier 104, multi-mode circuits 106 and 108, LO 112, phase-shifters 118 and 120, VGAs 122 and 124, band-end amplifier 126, and/or tunable filter 128), and so forth via the communication interface 206. In embodiments, the communication interface 206 may include a transmitter, receiver, transceiver, physical connection interface, or any combination thereof.

Figure 3:
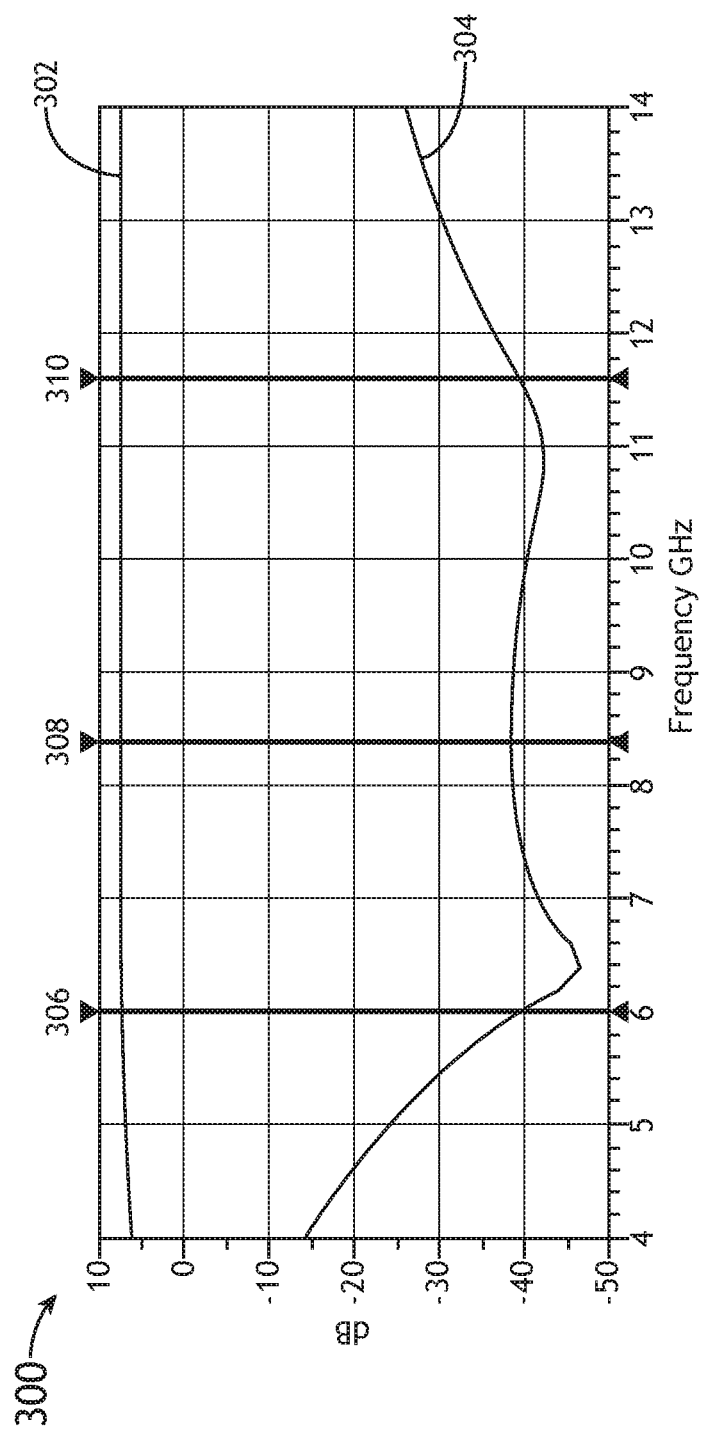
FIG. 3 is a graphical plot illustrating signal behavior of image summation and rejection utilizing phase and/or amplitude (gain) correction, in accordance with one or more embodiments of this disclosure.
Figure 4:
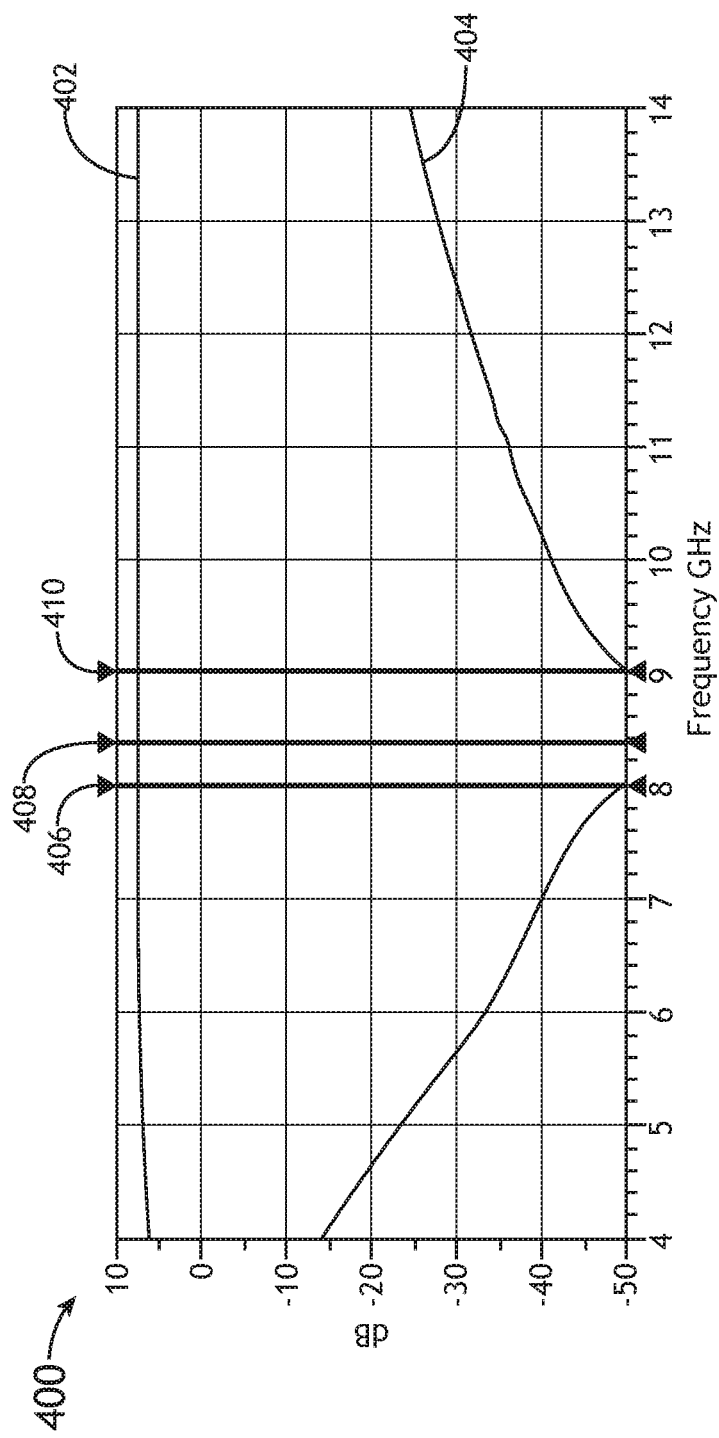
FIG. 4 is a graphical plot illustrating signal behavior of image summation and rejection utilizing phase and/or amplitude (gain) correction, in accordance with one or more embodiments of this disclosure.

FIGS. 3 and 4 are graphical plots illustrating small signal behavior capability of the reconfigurable image suppressing receiver 100 for image summation and rejection using phase/amplitude correction. FIG. 3 is a graphical plot 300 showing an example of wideband calibration with >45 dBc rejection across approximately 5.5 GHz. In FIG. 3, curve 302 is the image summation signal response and curve 304 is the image rejection signal response. As can be seen in the graphical plot 300: at point 306 (frequency=6 GHz), curve 302 has a value of approximately 7.38 dBc and curve 304 has a value of approximately −39.61 dBc; at point 308 (frequency=8.4 GHz), curve 302 has a value of approximately 7.63 dBc and curve 304 has a value of approximately −38.40 dBc; and at point 310 (frequency=11.6 GHz), curve 302 has a value of approximately 7.60 dBc and curve 304 has a value of approximately −39.34 dBc. These values are provided as examples, for illustrative purposes, and are not intended as limitations on the scope of this disclosure unless otherwise provided in the claims.

In embodiments, the controller 200 may be configured to zoom in on narrower bandwidths with increased image rejection and sensitivity by adjusting the first phase of the first instance of the local signal and the second phase of the second instance of the local signal (e.g., by tuning phase-shifters 118 and 120 and/or multi-mode circuits 106 and 108, also by adjusting gain and/or phase of the independent outputs of front-end amplifier 104). FIG. 4 is a graphical plot 400 showing an example of narrowband calibration with >55 dBc rejection across approximately 1 GHz. In FIG. 4, curve 402 is the image summation signal response and curve 404 is the image rejection signal response. As can be seen in the graphical plot 400: at point 406 (frequency=8 GHz), curve 402 has a value of approximately 7.611 dBc and curve 404 has a value of approximately −49.57 dBc; at point 408 (frequency=8.4 GHz), curve 402 has a value of approximately 7.61 dBc and curve 404 has a value of approximately −62.16 dBc; and at point 410 (frequency=9 GHz), curve 402 has a value of approximately 7.61 dBc and curve 404 has a value of approximately −49.92 dBc. These values are provided as examples, for illustrative purposes, and are not intended as limitations on the scope of this disclosure unless otherwise provided in the claims.

Figure 5:
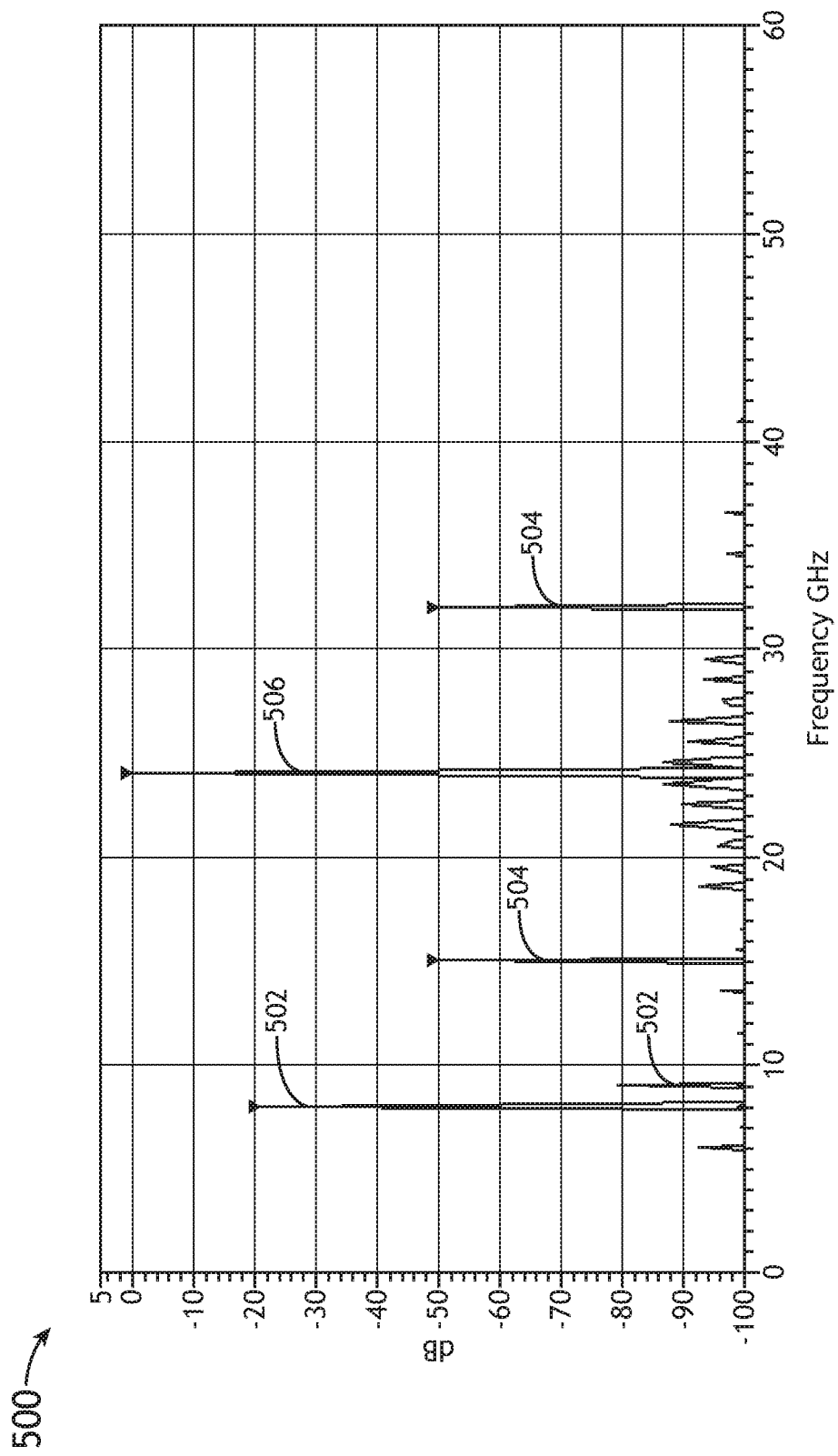
FIG. 5 is a graphical plot illustrating local oscillator (LO) input, radio frequency (RF) input, and intermediate frequency (IF) output signal responses with filtering to receive high sideband RF signals and reject low sideband RF signals, in accordance with one or more embodiments of this disclosure.
Figure 6:
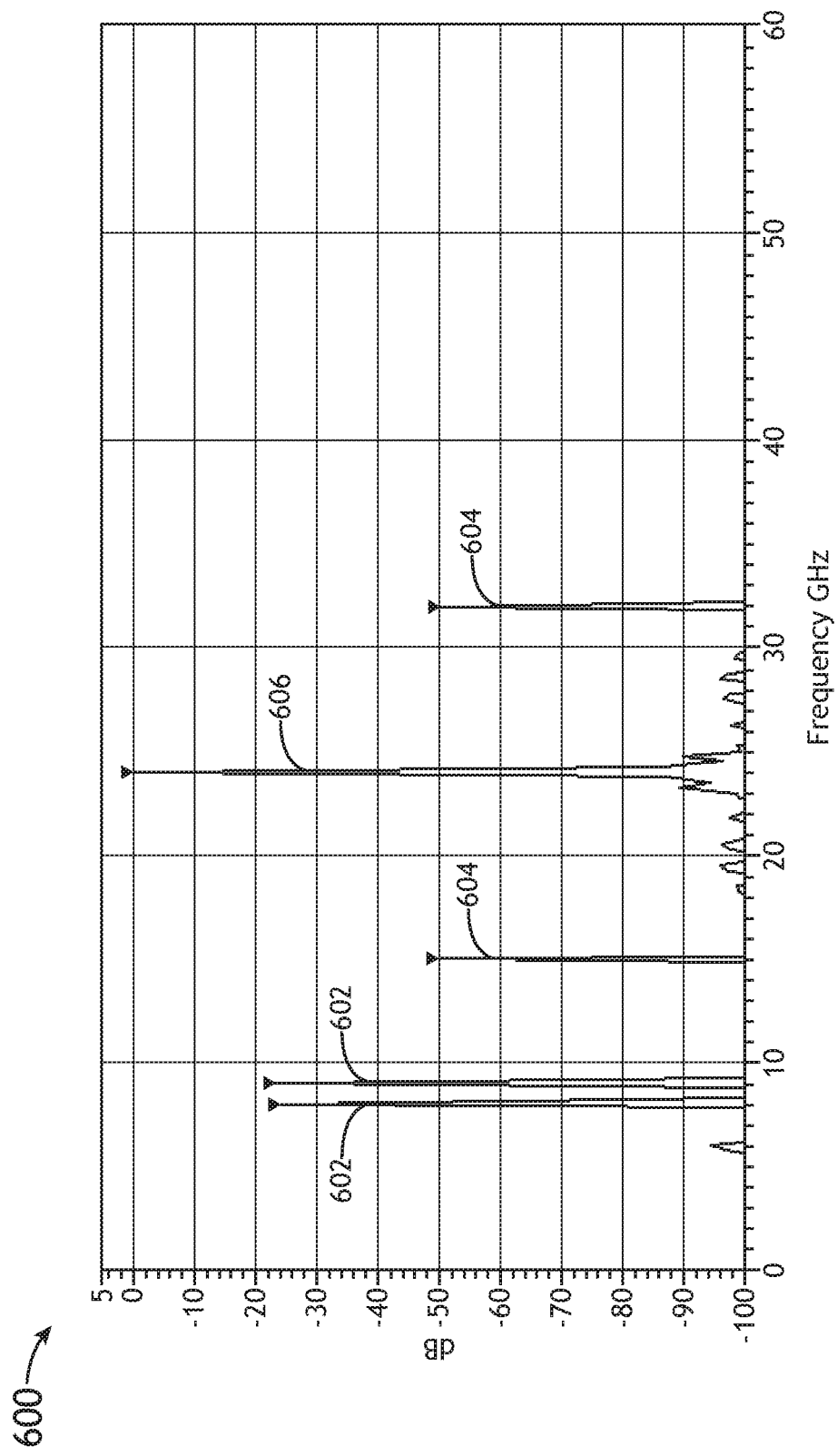
FIG. 6 is a graphical plot illustrating local oscillator (LO) input, radio frequency (RF) input, and intermediate frequency (IF) output signal responses with filtering to receive high and low sideband RF signals, in accordance with one or more embodiments of this disclosure.
Figure 7:
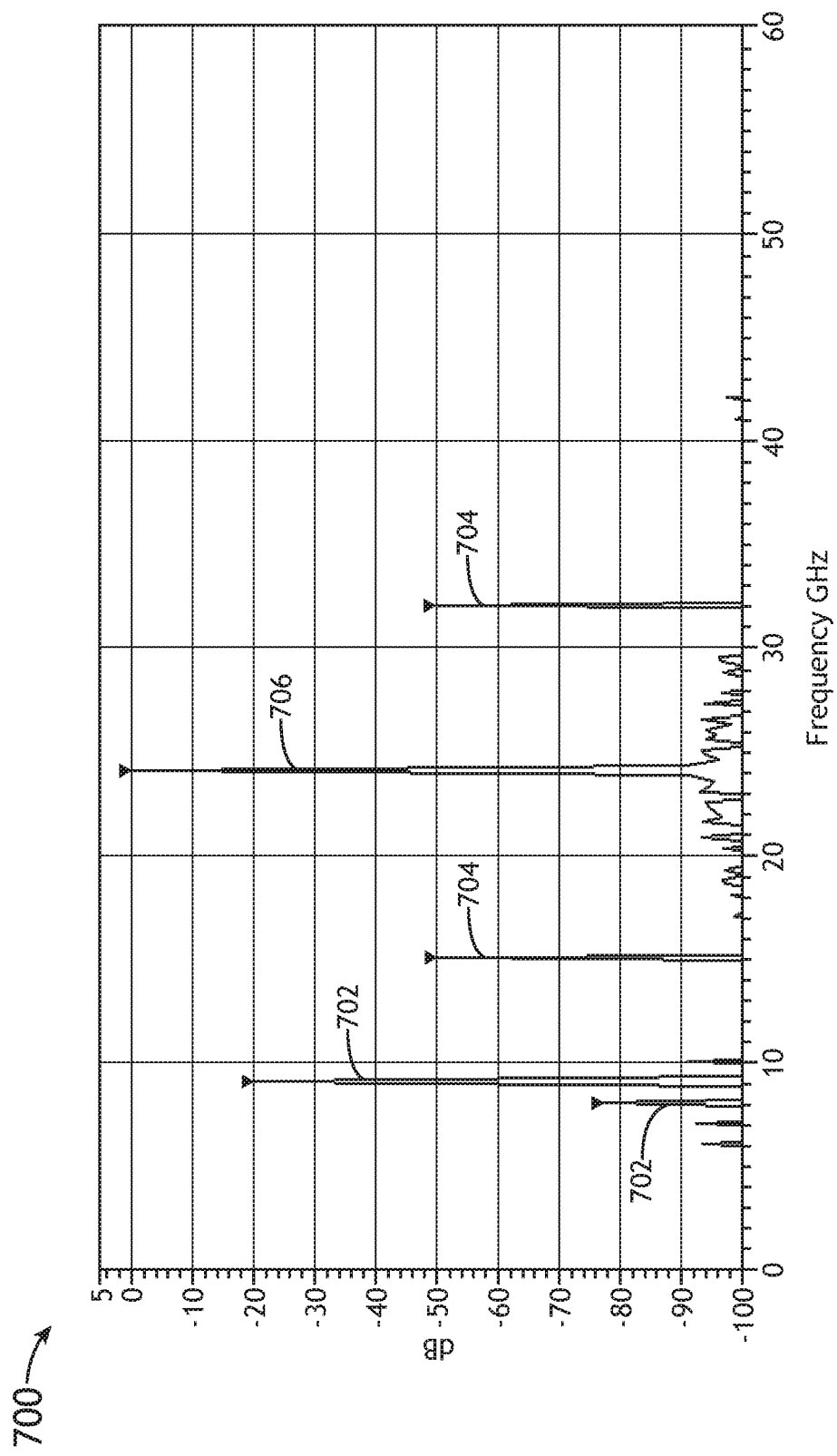
FIG. 7 is a graphical plot illustrating local oscillator (LO) input, radio frequency (RF) input, and intermediate frequency (IF) output signal responses with filtering to receive low sideband RF signals and reject high sideband RF signals, in accordance with one or more embodiments of this disclosure.

FIGS. 5 through 7 are graphical plots illustrating sideband selectivity of the reconfigurable image suppressing receiver 100. For example, the controller 200 may be configured to apply image rejection techniques described herein to selectively reject low side or high side IF signals. In some embodiments, the controller 200 is configured to select the (high or low) sideband of the reconfigurable image suppressing receiver 100 by causing the multi-mode circuits 106 and 108 to place the in-phase LO signal and the quadrature LO signal ±90 degrees out of phase while controlling the RF signals to 0 or 180 degrees out of phase. The controller 200 may be configured to select both sidebands of the reconfigurable image suppressing receiver 100 by causing the multi-mode circuits 106 and 108 to place the in-phase LO signal and the quadrature LO signal in-phase while the RF signals are also in-phase.

FIG. 5 is a graphical plot 500 illustrating an example of the LO input signal response 506, RF input signal response 504, and IF output signal response 502 with filtering (based on image rejection) to receive high sideband RF signals and reject low sideband RF signals. FIG. 6 is a graphical plot 600 illustrating an example of the LO input signal response 606, RF input signal response 604, and IF output signal response 602 with filtering (based on image rejection) to receive high and low sideband RF signals. FIG. 7 is a graphical plot 700 illustrating an example of the LO input signal response 706, RF input signal response 704, and IF output signal response 702 with filtering (based on image rejection) to receive low sideband RF signals and reject high sideband RF signals.

Figure 8:
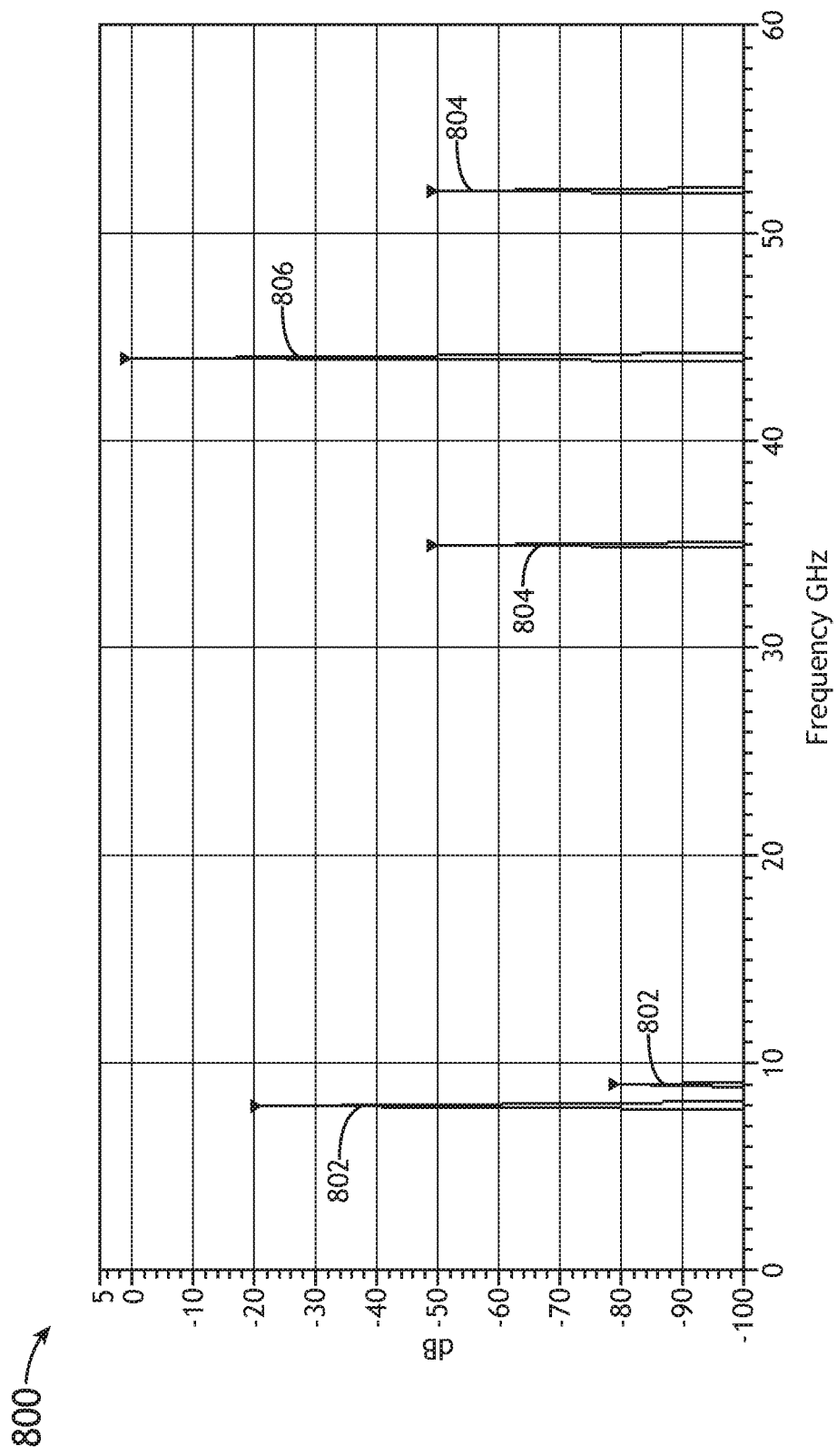
FIG. 8 is a graphical plot illustrating local oscillator (LO) input, radio frequency (RF) input, and intermediate frequency (IF) output signal responses with filtering to receive high sideband RF signals and reject low sideband RF signals, in accordance with one or more embodiments of this disclosure.
Figure 9:
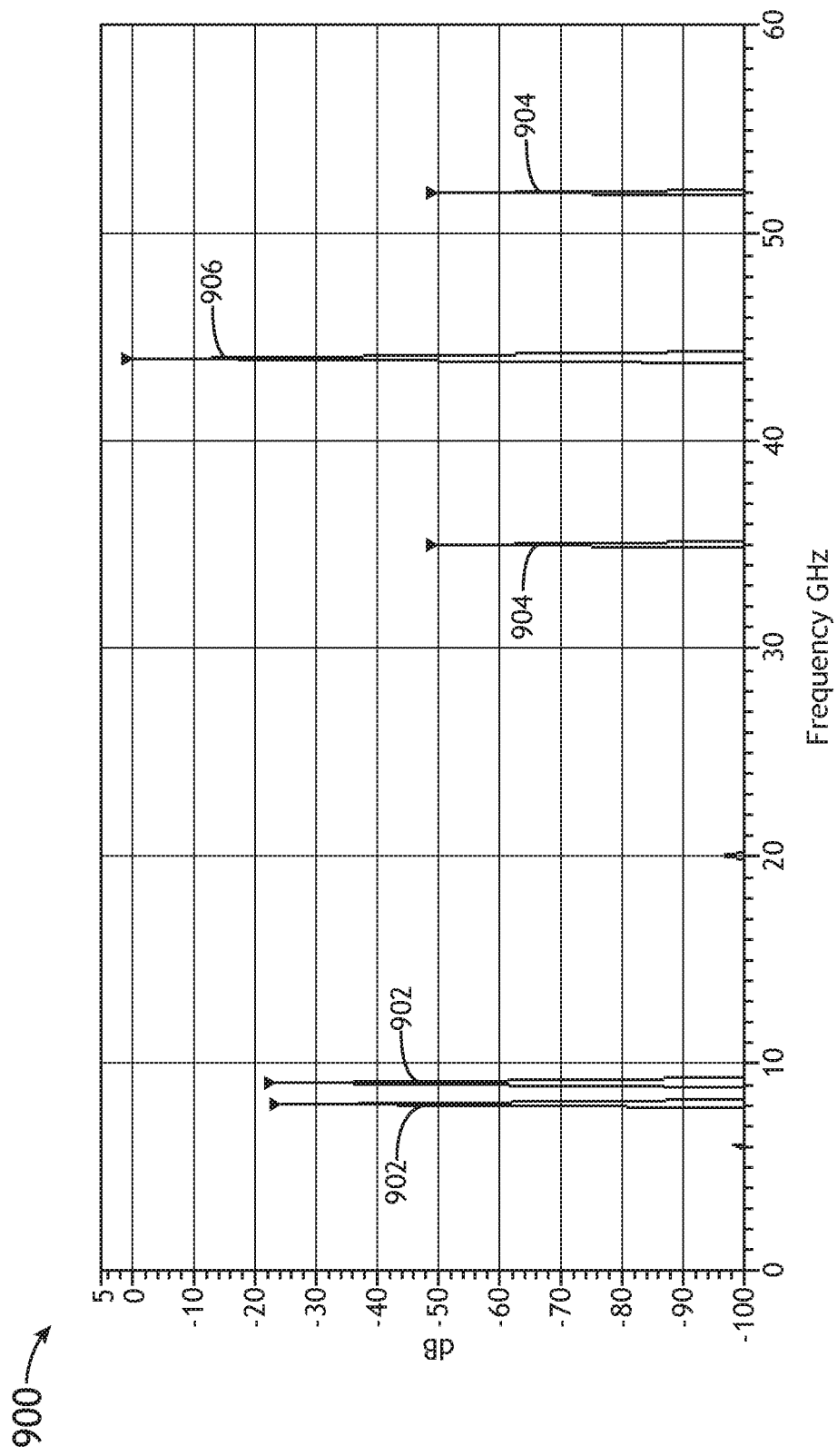
FIG. 9 is a graphical plot illustrating local oscillator (LO) input, radio frequency (RF) input, and intermediate frequency (IF) output signal responses with filtering to receive high and low sideband RF signals, in accordance with one or more embodiments of this disclosure.
Figure 10:
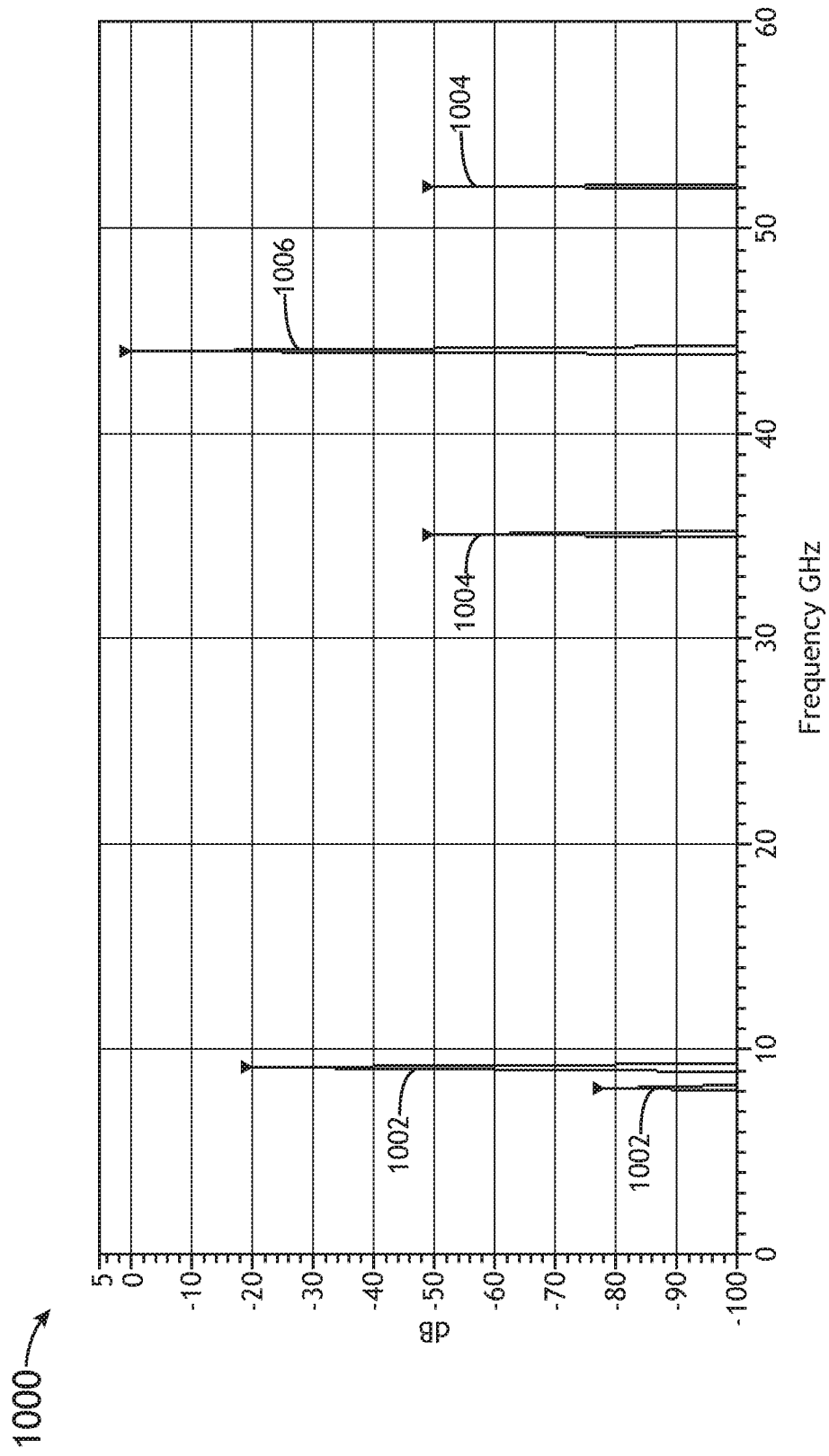
FIG. 10 is a graphical plot illustrating local oscillator (LO) input, radio frequency (RF) input, and intermediate frequency (IF) output signal responses with filtering to receive low sideband RF signals and reject high sideband RF signals, in accordance with one or more embodiments of this disclosure.

FIGS. 8 through 10 are also graphical plots illustrating sideband selectivity of the reconfigurable image suppressing receiver 100, shown at higher RF/LO frequencies than in FIGS. 5 through 7. For instance, FIG. 8 is a graphical plot 800 illustrating an example of the LO input signal response 806, RF input signal response 804, and IF output signal response 802 with filtering (based on image rejection) to receive high sideband RF signals and reject low sideband RF signals. FIG. 9 is a graphical plot 900 illustrating an example of the LO input signal response 906, RF input signal response 904, and IF output signal response 902 with filtering (based on image rejection) to receive high and low sideband RF signals. FIG. 10 is a graphical plot 1000 illustrating an example of the LO input signal response 1006, RF input signal response 1004, and IF output signal response 1002 with filtering (based on image rejection) to receive low sideband RF signals and reject high sideband RF signals.

In embodiments, the controller 200 may be configured to tune the LO to a different frequency to view additional RF spectrums (e.g., if no energy is observed in the spectrum being analyzed). The controller 200 may be further configured to apply image rejection techniques described herein to selectively reject low side or high side RF signals and/or perform LO phase or RF/IF amplitude/gain adjustments to zoom in on desired frequencies.

Referring now to FIGS. 11 through 15, the reconfigurable wideband image suppressing receiver 100 is capable of compensating for statistical and temperature variations of its components. For example, the controller 200 may be configured to adjust the first phase of the first instance of the local signal and the second phase of the second instance of the local signal (e.g., by tuning phase-shifters 118 and 120) to compensate for statistical and temperature variations of components. The controller 200 may also be configured to adjust the gain/amplitude of the in-phase IF signal and the gain/amplitude of the quadrature IF signal (e.g., by tuning multi-mode circuits 106 and 108 and/or the independent outputs of front-end amplifier 104) to compensate for statistical and temperature variations of components. In some embodiments, precision control of LO phase and RF/IF I/Q amplitude allows for statistical and temperature variations of wideband (e.g., 90 degree) transformer components to be "healed." Furthermore, the controller 200 may be configured to cause the multi-mode circuits 106 and 108 to control the phases of the LO signals around +90 degrees or +270 degrees to tune image rejection behavior of the reconfigurable image suppressing receiver 100 (e.g., to help optimize image rejection capability).

Figure 11:
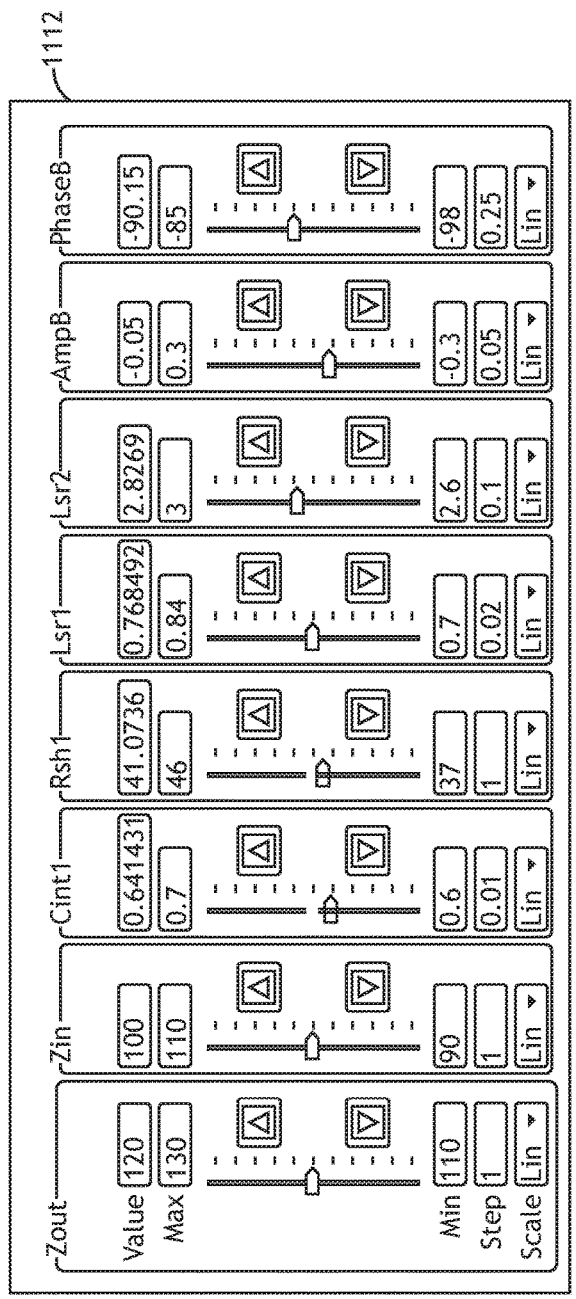
FIG. 11 is a graphical plot illustrating signal behavior of image summation and rejection at nominal circuit and phase/amplitude conditions, in accordance with one or more embodiments of this disclosure.
Figure 11:
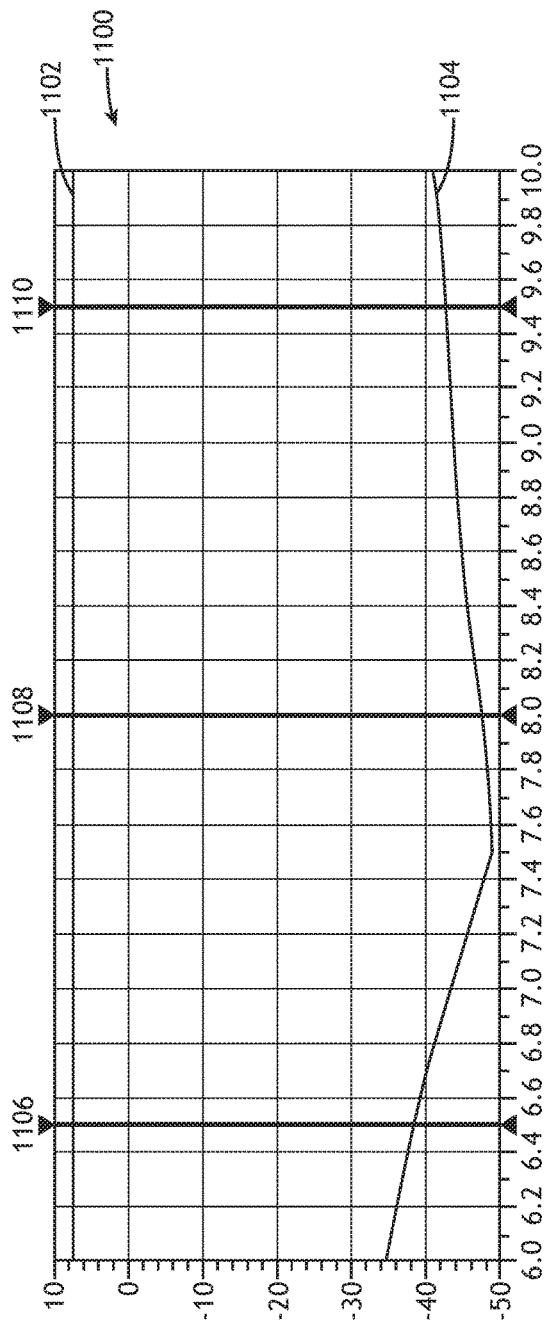

FIG. 11 shows a graphical plot 1100 illustrating small signal behavior capability of the reconfigurable image suppressing receiver 100 for image summation and rejection at nominal values 1112 of resistance (R), inductance (L), capacitance (C) of the IF quadrature network, IF amplitude and LO phase parameters. In FIG. 11, curve 1102 is the image summation signal response and curve 1104 is the image rejection signal response. As can be seen in the graphical plot 1100: at point 1106 (frequency=6.5 GHz), curve 1102 has a value of approximately 7.34 dBc and curve 1104 has a value of approximately −38.29 dBc; at point 1108 (frequency=8 GHz), curve 1102 has a value of approximately 7.32 dBc and curve 1104 has a value of approximately −47.51 dBc; and at point 1110 (frequency=9.5 GHz), curve 1102 has a value of approximately 7.30 dBc and curve 1104 has a value of approximately −42.72 dBc. These values are provided as examples, for illustrative purposes, and are not intended as limitations on the scope of this disclosure unless otherwise provided in the claims.

Figure 12:
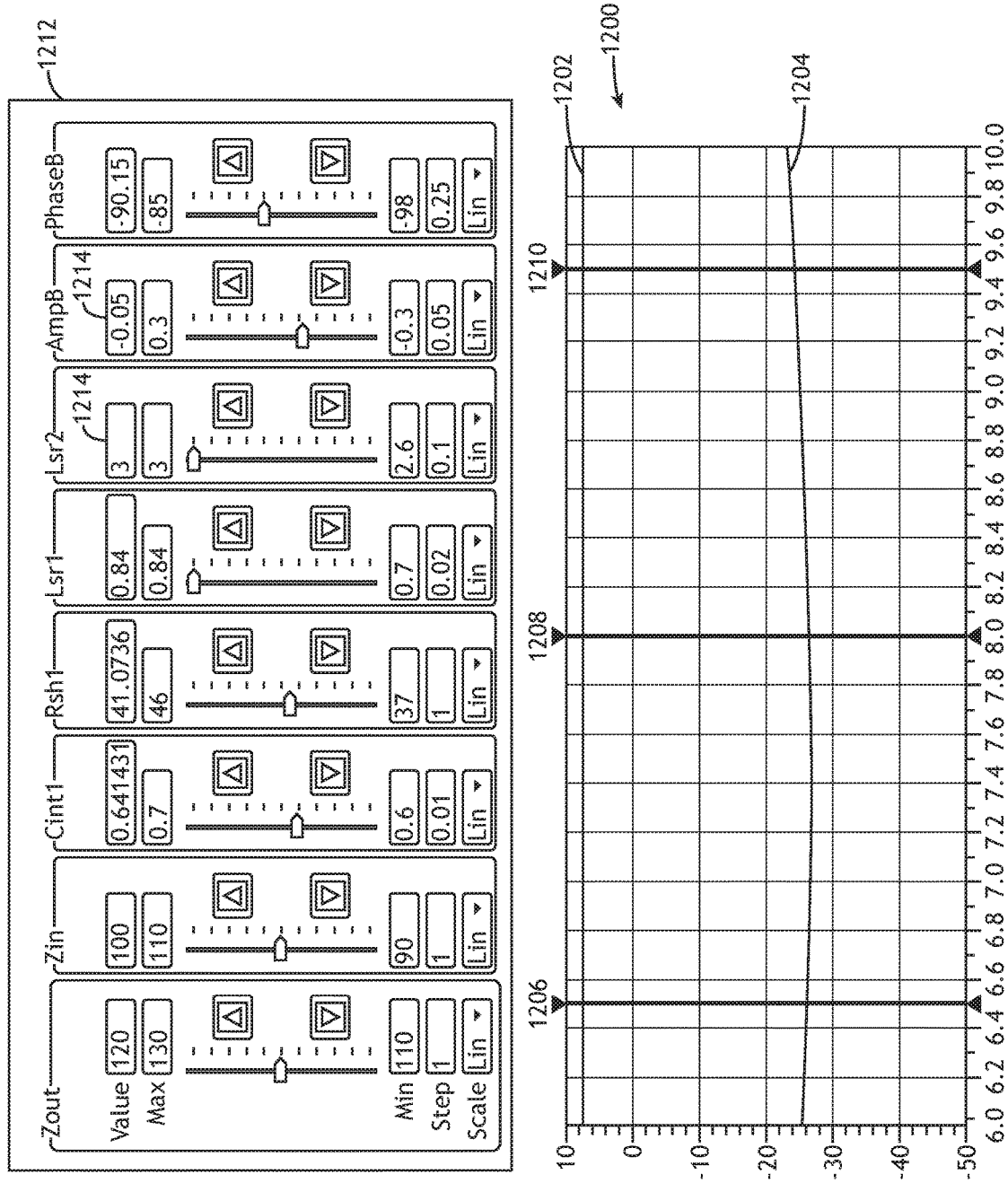
FIG. 12 is a graphical plot illustrating signal behavior of image summation and rejection with statistical variation of the circuit inductance (L) values for the reconfigurable image suppressing receiver, in accordance with one or more embodiments of this disclosure.

FIG. 12 shows a graphical plot 1200 illustrating small signal behavior capability of the reconfigurable image suppressing receiver 100 for image summation and rejection where values 1212 of inductance (L within the IF I/Q quadrature block) are modified by statistical variation (e.g., an increase) of the inductance (L) values 1214. It is noted that the IF amplitude and LO quadrature phase balance is kept the same between FIGS. 11 and 12. As a result, in the graphical plot 1200: at point 1206 (frequency=6.5 GHz), curve 1202 has a value of approximately 7.27 dBc and curve 1204 has a value of approximately −26.14 dBc; at point 1208 (frequency=8 GHz), curve 1202 has a value of approximately 7.23 dBc and curve 1204 has a value of approximately −26.17 dBc; and at point 1210 (frequency=9.5 GHz), curve 1202 has a value of approximately 7.192 dBc and curve 1204 has a value of approximately −23.97 dBc. Hence, the statistical change in the nominal inductance value caused a degradation in image rejection behavior when the LO phase and IF amplitude behavior was kept the same as that in the case of FIG. 11. These values are provided as examples, for illustrative purposes, and are not intended as limitations on the scope of this disclosure unless otherwise provided in the claims.

Figure 13:
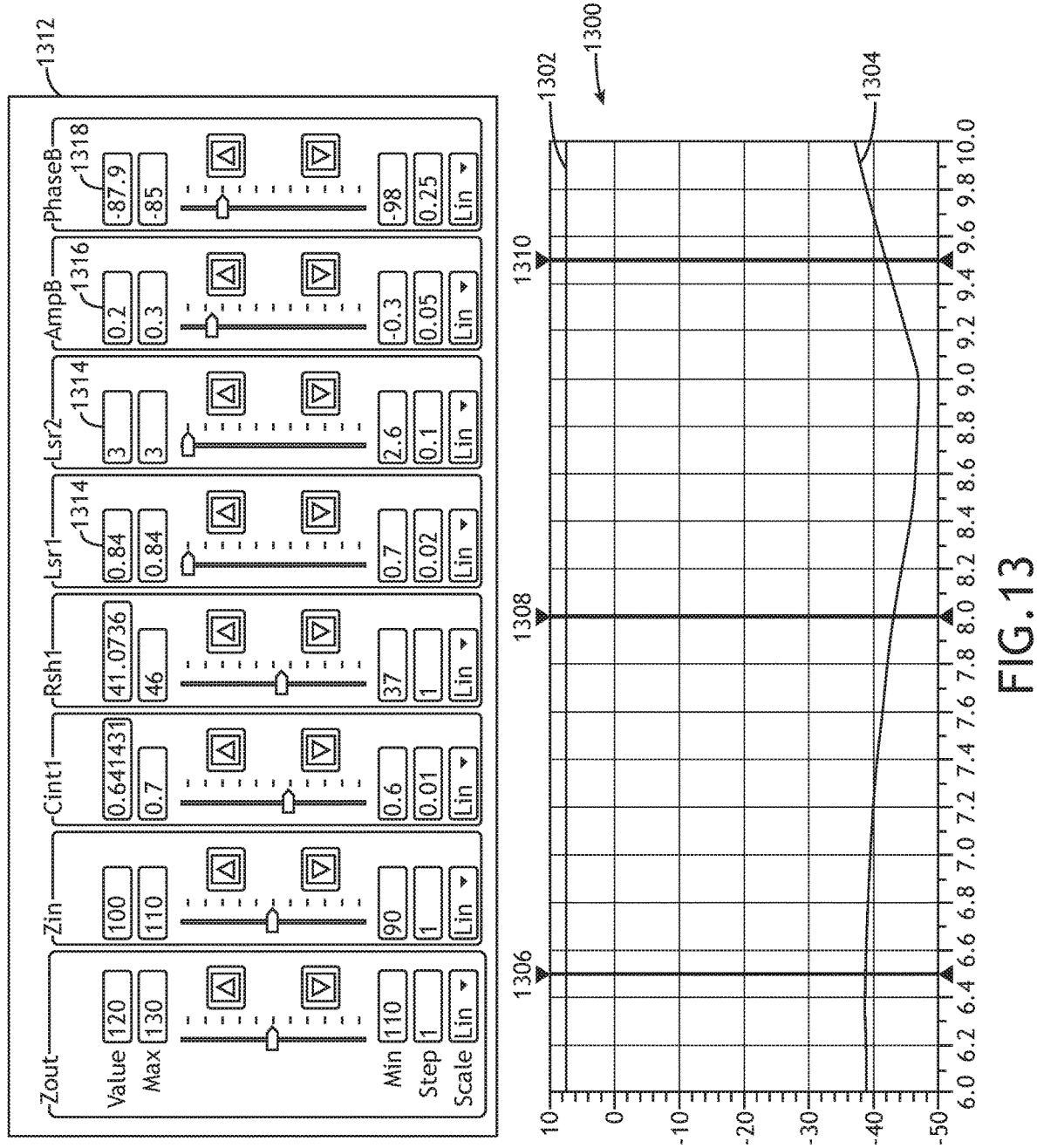
FIG. 13 is a graphical plot illustrating signal behavior of image summation and rejection with adjusted phase and amplitude within the reconfigurable circuit parameters to compensate for statistical variation of the inductance (L) values for the reconfigurable image suppressing receiver, in accordance with one or more embodiments of this disclosure.

As shown in FIG. 13, by adjusting the IF amplitude and the LO phase with the reconfigurable circuit components, the reconfigurable image suppressing receiver 100 can recover image rejection capability (e.g., restore the image rejection capability from the behavior illustrated in FIG. 12 back to the behavior illustrated in FIG. 11, or at least partially recover the image rejection capability). For example, FIG. 13 shows a graphical plot 1300 illustrating small signal behavior capability of the reconfigurable image suppressing receiver 100 for image summation and rejection where values 1312 of resistance (R), inductance (L), capacitance (C), are the same as in the statistical variation condition of FIG. 12, but where the IF amplitude 1316 and LO phase 1318 behaviors of the reconfigurable circuits are also modified to heal the degraded response caused by the statistical variation of the inductance (L) values 1314 and wideband image rejection is restored. As a result, in the graphical plot 1300: at point 1306 (frequency=6.5 GHz), curve 1302 has a value of approximately 7.40 dBc and curve 1304 has a value of approximately −38.41 dBc; at point 1308 (frequency=8 GHz), curve 1302 has a value of approximately 7.36 dBc and curve 1304 has a value of approximately −42.83 dBc; and at point 1310 (frequency=9.5 GHz), curve 1302 has a value of approximately 7.32 dBc and curve 1304 has a value of approximately −41.66 dBc. These values are provided as examples, for illustrative purposes, and are not intended as limitations on the scope of this disclosure unless otherwise provided in the claims.

Figure 14:
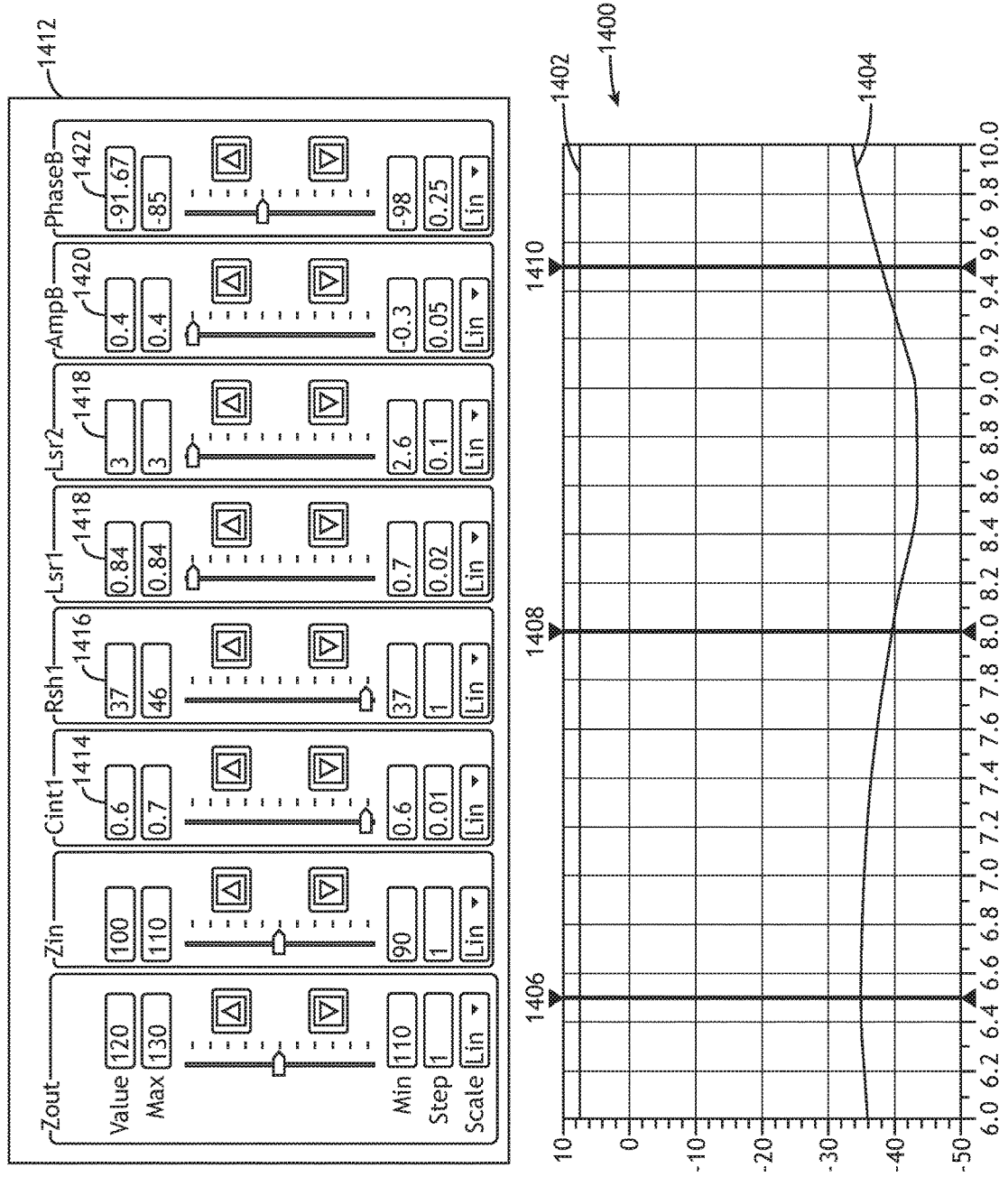
FIG. 14 is a graphical plot illustrating signal behavior of image summation and rejection, with adjusted phase and amplitude within the reconfigurable circuit parameters to form a wideband response by compensating the amplitude and phase balance for statistical variation of the resistance, inductance and capacitance (R, L, C) values for the reconfigurable image suppressing receiver, in accordance with one or more embodiments of this disclosure (note the PhaseB and AmpB adjustments are different than FIG. 13)
Figure 15:
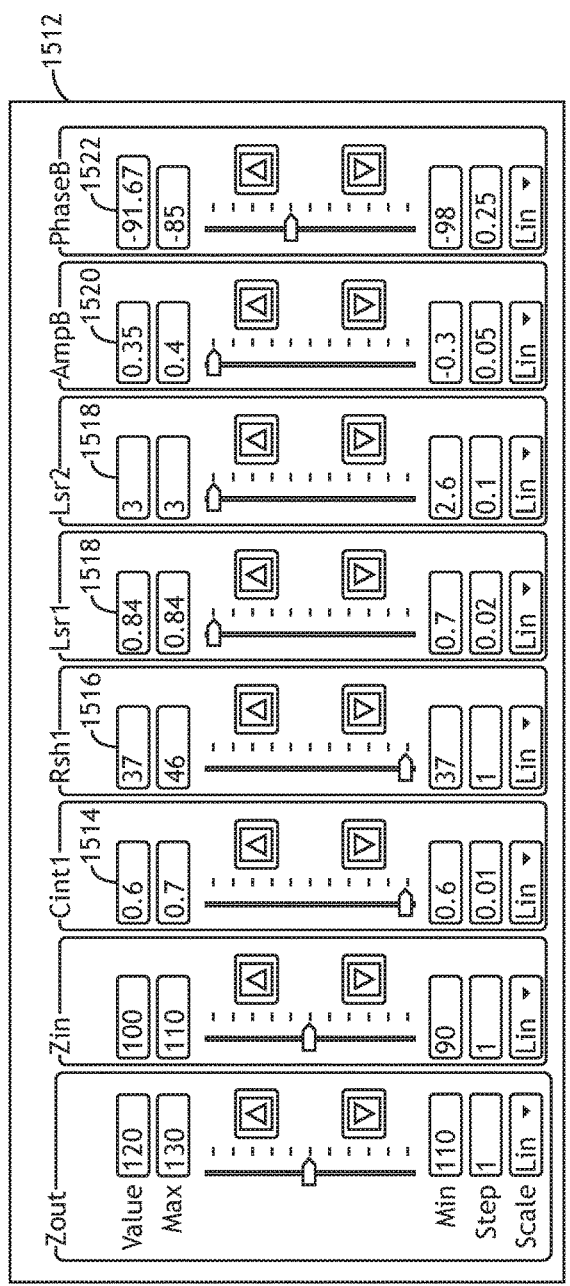
FIG. 15 is a graphical plot illustrating signal behavior of image summation and rejection with the same statistical variation of component values as in FIG. 14, but with a modified phase and amplitude to generate a narrower response (e.g., with increased rejection across a 1 GHz bandwidth), in accordance with one or more embodiments of this disclosure.
Figure 15:
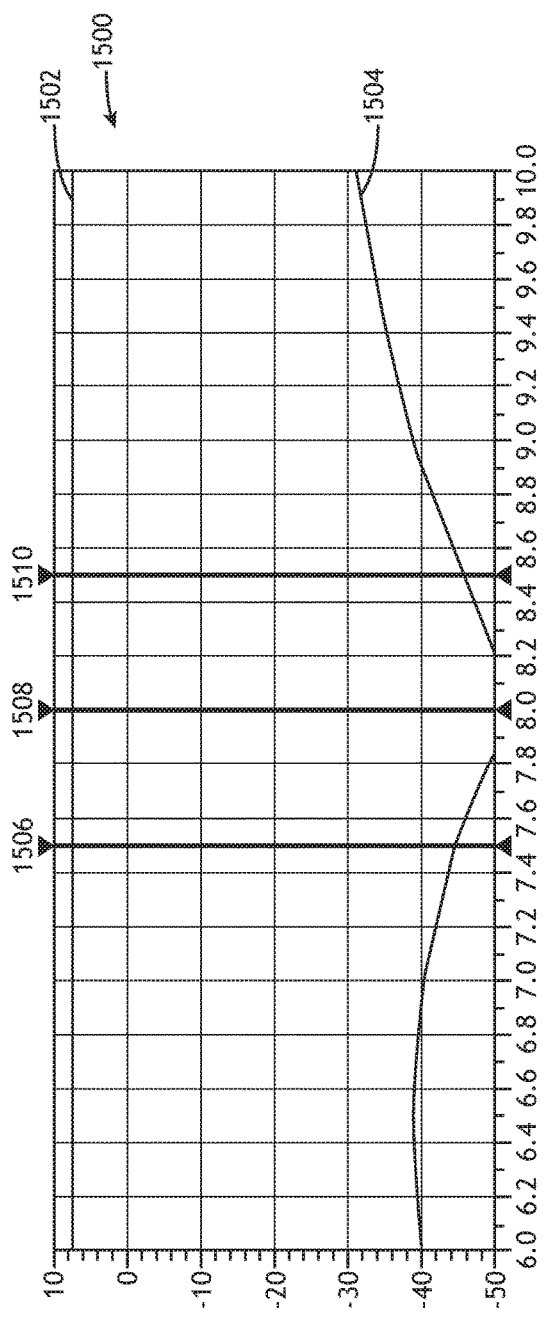

FIGS. 14 and 15 are further illustrative of how the reconfigurable image suppressing receiver 100 can be reconfigured by adjusting LO phase and/or IF amplitude to "heal" image reject behavior when all the R, L and C components have had a statistical shift in their values, as well as adjusting amp/phase behavior to generate a narrower response (e.g., with increased rejection across a 1 GHz bandwidth). For instance, FIG. 14 shows a graphical plot 1400 illustrating small signal behavior capability of the reconfigurable image suppressing receiver 100 for image summation and rejection at values 1412 where the R and C values are at their statistical minimum, and the L's are at their statistical maximum. In the graphical plot 1400: at point 1406 (frequency=6.5 GHz), curve 1402 has a value of approximately 7.66 dBc and curve 1404 has a value of approximately −34.78 dBc; at point 1408 (frequency=8 GHz), curve 1402 has a value of approximately 7.61 dBc and curve 1404 has a value of approximately −39.48 dBc; and at point 1410 (frequency=9.5 GHz), curve 1402 has a value of approximately 7.55 dBc and curve 1404 has a value of approximately −38.00 dBc. These values are provided as examples, for illustrative purposes, and are not intended as limitations on the scope of this disclosure unless otherwise provided in the claims.

As shown in FIG. 15, by adjusting the IF amplitude and the LO phase from the wideband configuration of FIG. 14, the reconfigurable image suppressing receiver 100 can modify the image rejection capability and zoom in on narrower bandwidths with increased levels of rejection for higher sensitivity. For example, FIG. 15 shows a graphical plot 1500 illustrating small signal behavior capability of the reconfigurable image suppressing receiver 100 for image summation and rejection, where the LO phase 1522 and IF amplitude balance 1520 are modified to zoom in on a narrower (1 GHz) band of the spectrum. As a result, in the graphical plot 1500: at point 1506 (frequency=7.5 GHz), curve 1502 has a value of approximately 7.61 dBc and curve 1504 has a value of approximately −44.07 dBc; at point 1508 (frequency=8 GHz), curve 1502 has a value of approximately 7.59 dBc and curve 1504 has a value of approximately −52.32 dBc; and at point 1510 (frequency=8.5 GHz), curve 1502 has a value of approximately 7.56 dBc and curve 1504 has a value of approximately −45.36 dBc. These values are provided as examples, for illustrative purposes, and are not intended as limitations on the scope of this disclosure unless otherwise provided in the claims.

Various embodiments of a reconfigurable wideband image suppressing receiver have been described with reference to FIGS. 1 through 15. However, in other embodiments, the receiver may be modified without deviating from the scope of this disclosure. For example, any of the components (e.g., amplifier, multi-mode circuit, LO, buffer, phase-shifter, wideband combining transformer, filter, controller, etc.) described herein may be implemented by a plurality of components. In this regard, any reference to "a" or "the" component should be understood as a reference to "one or more" of the same component.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A reconfigurable image suppressing receiver, comprising:
    a front-end amplifier configured to receive a radio frequency (RF) signal from an antenna and adjust a gain of the RF signal;
    a first multi-mode circuit configured to mix a first instance of the RF signal with an in-phase local oscillator signal to generate an in-phase intermediate frequency (IF) signal;
    a second multi-mode circuit configured to mix a second instance of the RF signal with a quadrature local oscillator signal to generate a quadrature IF signal;
    a wideband combining transformer configured to combine the in-phase IF signal and the quadrature IF signal to generate a combined IF signal; and
    a controller configured to adjust one or more tunable parameters associated with the combined IF signal, wherein the controller is configured to select a sideband or both sidebands of the reconfigurable image suppressing receiver by controlling at least one of a phase parameter of the in-phase and quadrature local oscillator signals or an amplitude parameter of the in-phase and quadrature IF signals,
    wherein the first multi-mode circuit is further configured to adjust a first phase of the in-phase local oscillator signal, and the second multi-mode circuit is further configured to adjust a second phase of the quadrature local oscillator signal,
    wherein the controller is configured to select the sideband of the reconfigurable image suppressing receiver by causing the first multi-mode circuit and the second multi-mode circuit to place the in-phase local oscillator signal and the quadrature local oscillator signal ±90 degrees out of phase when the first instance of the RF signal and the second instance of the RF signal are 0 or 180 degrees out of phase.

2. The reconfigurable image suppressing receiver of claim 1, wherein the controller is configured to select both sidebands of the reconfigurable image suppressing receiver by causing the first multi-mode circuit and the second multi-mode circuit to place the in-phase local oscillator signal and the quadrature local oscillator signal in-phase when the first instance of the RF signal and the second instance of the RF signal are in-phase.

3. The reconfigurable image suppressing receiver of claim 1, wherein the controller is configured to cause the first multi-mode circuit and the second multi-mode circuit to adjust the first phase of the in-phase local oscillator signal and the second phase of the quadrature local oscillator signal to compensate for statistical and temperature variations of components.

4. The reconfigurable image suppressing receiver of claim 1, wherein the controller is configured to cause the first multi-mode circuit and the second multi-mode circuit to adjust the first phase of the in-phase local oscillator signal and the second phase of the quadrature local oscillator signal around +90 degrees or +270 degrees to tune image rejection behavior of the reconfigurable image suppressing receiver.

5. The reconfigurable image suppressing receiver of claim 1, wherein the first multi-mode circuit is further configured to adjust a first gain of the in-phase IF signal, and wherein the second multi-mode circuit is further configured to adjust a second gain of the quadrature IF signal.

6. The reconfigurable image suppressing receiver of claim 5, wherein the controller is configured to cause the first multi-mode circuit and the second multi-mode circuit to adjust the first gain of the in-phase IF signal and the second gain of the quadrature IF signal to compensate for statistical and temperature variations of components.

7. The reconfigurable image suppressing receiver of claim 1, wherein the controller is configured to cause the front-end amplifier to adjust the gain of the RF signal to compensate for statistical and temperature variations of components.

8. The reconfigurable image suppressing receiver of claim 1, further comprising a local oscillator configured to generate a local signal with a selected frequency.

9. The reconfigurable image suppressing receiver of claim 8, further comprising:
a first phase shifter configured to adjust a first phase of a first instance of the local signal to generate the in-phase local oscillator signal; and
a second phase shifter configured to adjust a second phase of a second instance of the local signal to generate the quadrature local oscillator signal.

10. The reconfigurable image suppressing receiver of claim 1, further comprising a back-end amplifier configured to adjust a gain of the combined IF signal.

11. The reconfigurable image suppressing receiver of claim 10, further comprising a tunable filter between the wideband combining transformer and the back-end amplifier.

12. The reconfigurable image suppressing receiver of claim 11, wherein the controller is configured to adjust the one or more tunable parameters by reconfiguring the tunable filter into a selected type of filter and adjusting at least one of a gain response shape or a frequency response shape of the tunable filter.

13. The reconfigurable image suppressing receiver of claim 12, wherein the selected type of filter is a low pass, high pass, bandpass, or notch filter.

* * * * *